United States Patent
Williams et al.

(10) Patent No.: US 8,201,231 B2
(45) Date of Patent: Jun. 12, 2012

(54) AUTHENTICATED CREDENTIAL-BASED MULTI-TENANT ACCESS TO A SERVICE

(75) Inventors: Juanya Davon Williams, Bothell, WA (US); Ashutosh Badwe, Redmond, WA (US); Adam Patrick Edwards, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/677,332

(22) Filed: Feb. 21, 2007

(65) Prior Publication Data

US 2008/0201767 A1    Aug. 21, 2008

(51) Int. Cl.
*H04L 29/06* (2006.01)

(52) U.S. Cl. ............................................. 726/7; 705/59

(58) Field of Classification Search .................. None
See application file for complete search history.

(56) References Cited

U.S. PATENT DOCUMENTS

| | | | |
|---|---|---|---|
| 5,604,490 A | 2/1997 | Blakley et al. | |
| 5,784,463 A * | 7/1998 | Chen et al. | 713/171 |
| 5,956,505 A * | 9/1999 | Manduley | 713/1 |
| 6,047,268 A | 4/2000 | Bartoli et al. | |
| 6,134,659 A * | 10/2000 | Sprong et al. | 713/190 |
| 6,260,141 B1 * | 7/2001 | Park | 713/155 |
| 6,343,313 B1 | 1/2002 | Salesky et al. | |
| 6,701,438 B1 | 3/2004 | Prabandham et al. | |
| 6,769,068 B1 | 7/2004 | Brozowski et al. | |
| 6,829,704 B2 * | 12/2004 | Zhang et al. | 713/1 |
| 7,024,696 B1 * | 4/2006 | Bahar | 726/26 |
| 7,117,529 B1 | 10/2006 | O'Donnell et al. | |
| 7,331,063 B2 * | 2/2008 | Gunyakti et al. | 726/30 |
| 7,565,323 B2 * | 7/2009 | Hughes et al. | 705/50 |
| 7,975,312 B2 * | 7/2011 | Broderson et al. | 726/30 |
| 2001/0034712 A1 * | 10/2001 | Colvin | 705/52 |
| 2002/0152405 A1 * | 10/2002 | Colvin | 713/202 |
| 2003/0149900 A1 | 8/2003 | Glassman et al. | |
| 2004/0039705 A1 * | 2/2004 | Svancarek et al. | 705/51 |
| 2004/0093519 A1 | 5/2004 | Grobman | |
| 2004/0103280 A1 * | 5/2004 | Balfanz et al. | 713/169 |
| 2004/0117640 A1 | 6/2004 | Chu et al. | |
| 2004/0123152 A1 | 6/2004 | Le Saint | |

(Continued)

FOREIGN PATENT DOCUMENTS

WO    0182038 A2    11/2001

(Continued)

OTHER PUBLICATIONS

Axelsson, "Aspects of the Modelling and Performance of Intrusion Detection," Thesis for the Degree of Licentiate of Engineering, 2000, 150 pages, Stefan Axelsson, Chalmers University of Technology, Sweden.

(Continued)

*Primary Examiner* — Nathan Flynn
*Assistant Examiner* — Michael R Vaughan
(74) *Attorney, Agent, or Firm* — Senniger Powers LLP

(57) ABSTRACT

Associating a computing device with a group of other computing devices. A service receives a common credential from the computing device and associates the computing device with the other computing devices also associated with the common credential. The service generates a machine-specific credential for use by the computing device in subsequent communications with the service. The machine-specific credential is used to authenticate, identify, and group the computing device with the other computing devices in the subsequent communications.

19 Claims, 5 Drawing Sheets

U.S. PATENT DOCUMENTS

| | | |
|---|---|---|
| 2005/0005286 A1* | 1/2005 | Koskela et al. ............... 725/31 |
| 2005/0033994 A1* | 2/2005 | Suzuki ........................ 713/202 |
| 2005/0090731 A1* | 4/2005 | Minogue et al. ............. 600/407 |
| 2005/0132192 A1 | 6/2005 | Jeffries et al. |
| 2005/0138377 A1 | 6/2005 | First et al. |
| 2005/0220304 A1* | 10/2005 | Lenoir et al. ................ 380/255 |
| 2005/0256805 A1* | 11/2005 | Satkunanathan et al. ....... 705/59 |
| 2005/0289356 A1 | 12/2005 | Shoham |
| 2006/0015933 A1 | 1/2006 | Ballinger et al. |
| 2006/0048236 A1* | 3/2006 | Multerer et al. ............... 726/28 |
| 2006/0123234 A1 | 6/2006 | Schmidt et al. |
| 2006/0179486 A1* | 8/2006 | Bahar ............................ 726/26 |
| 2006/0224890 A1 | 10/2006 | Zhou et al. |
| 2006/0282681 A1 | 12/2006 | Scheidt et al. |
| 2007/0260548 A1* | 11/2007 | Farrugia et al. ................ 705/59 |
| 2007/0261105 A1* | 11/2007 | Drath et al. ...................... 726/4 |
| 2008/0005026 A1* | 1/2008 | Cross et al. .................... 705/51 |
| 2008/0282360 A1* | 11/2008 | Bahar ............................ 726/30 |
| 2009/0031430 A1* | 1/2009 | Ward et al. ..................... 726/30 |
| 2010/0017886 A1* | 1/2010 | Desmicht et al. ............... 726/26 |

FOREIGN PATENT DOCUMENTS

| | | |
|---|---|---|
| WO | 2004049621 A1 | 6/2004 |

OTHER PUBLICATIONS

Unknown, "Delivering PLM On-Demand," 4 pages, 2007, Arena Solutions, Inc., USA.

Steiner et al., "Kerberos: An Authentication Service for Open Network Systems," 1988, 15 pages, Massachusetts Institute of Technology, USA.

* cited by examiner

AUTHENTICATED CREDENTIAL-BASED MULTI-TENANT ACCESS TO A SERVICE

BACKGROUND

In un-trusted environments such as where computing devices are connected to a network such as the Internet, some applications or services desire to identify particular computing devices, to verify communications as originating from the particular computing device, and to relate the particular computing device to a group of computing devices that share an account or are "tenants" of the service. Existing systems fail to disclose or suggest an automated mechanism for implementing such applications or services. For example, some existing systems use unsecured electronic mail as a means of authenticating data from a computing device. In such systems, the service has to simply trust that the electronic mail originated from the stated computing device and has not been corrupted or tampered with.

SUMMARY

Embodiments of the invention associate particular computing devices with other computing devices. A first computing device in an embodiment receives a first credential from a second computing device and associates the first credential with other computing devices also associated with the first credential. Aspects of the invention generate a second credential that is particular to the second computing device. The generated second credential is transmitted to the second computing device for use in subsequent communications with the first computing device. The first computing device exposes services to the second computing device based on the second credential in the subsequent communications.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
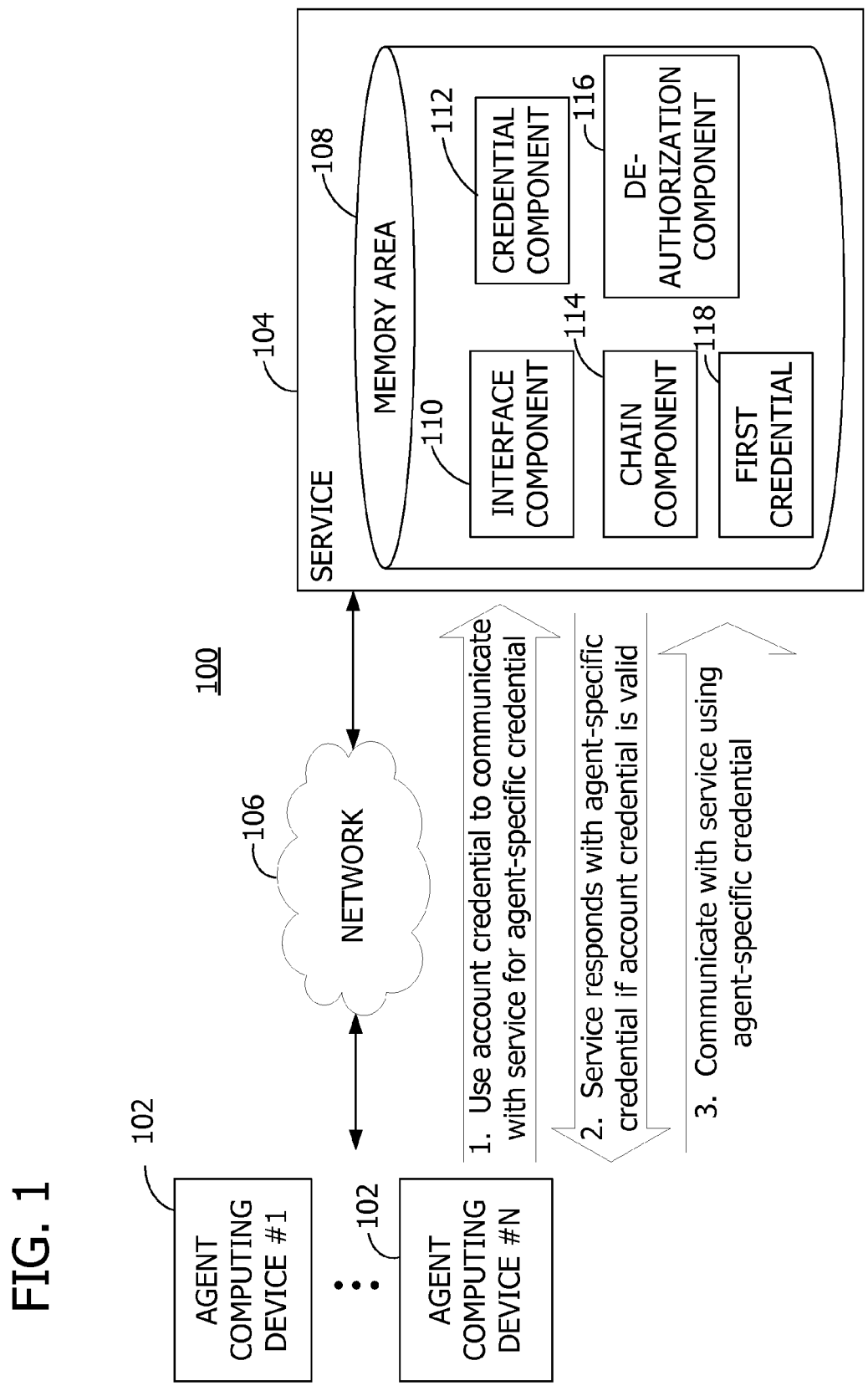
FIG. 1 is an exemplary block diagram illustrating the exchange of credentials between an agent computer and a service.

An embodiment of the invention such as shown in FIG. 1 provisions a computing device with a particular credential based on a common credential. In particular, aspects of the invention are applicable for authentication, asset management, software distribution, and other applications. While embodiments of the invention are described and illustrated herein with reference to an agent communicating with a service, or a client communicating with a server, aspects of the invention are operable in environments in which any computing devices communicate.

Referring again to FIG. 1, an exemplary block diagram illustrates the exchange of credentials between a plurality of agent computing devices 102 such as agent computing device #1 through agent computing device #N (where N is a positive integer value) and a service 104. The service 104 may be a web service executing on a computing device, or other service that communicates with the agent computing devices 102. The service 104 may be used for software distribution, asset management, or other applications. The service 104 enables agent computing devices 102 to be identified and allows for multi-tenant access to the service 104 such that a particular agent computing device 102 may be attached to a particular account. The service 104 may be referred to as a first computing device that exposes services (e.g., web services) to the plurality of the agent computing devices 102. Each of the agent computing devices 102 may be referred to as second computing devices. In operation, the service 104 may provision, issue, generate, determine, or otherwise create an account credential, certificate, token, first credential (e.g., first credential 118), or the like for a particular organization, company, group of users, or other entity. Each account credential is associated with account information that is particular to the organization.

For example, a company such as Company A may open an account with the service 104 for the service 104 to manage or maintain a plurality of the agent computing devices 102 for the company. The service 104 generates an agent package for each of the agent computing devices 102 including an executable (e.g., an operating system or application program), configuration information, and the account credential or first credential 118 associated with the account of Company A. The agent package is distributed (e.g., transmitted) to each of the agent computing devices 102 of Company A. The agent package is either installed automatically upon receipt by each agent computing device 102, or manually installed by, for example, an account administrator. In an embodiment, the account credential is included in a software product.

Upon execution or installation of the executable in the agent package by each agent computing device 102, each agent computing device 102 communicates with the service 104, automatically and without human intervention in an embodiment, to obtain a machine-specific or agent-specific credential (e.g., a second credential). In an embodiment, a user associated with the agent computing device 102 is agnostic to the process illustrated in FIG. 1. Each agent computing device 102 sends to the service 104 a request for the agent-specific credential. The request includes the account credential. Upon receipt of the request, the service 104 determines the validity of the account credential (e.g., not expired), provisions the agent-specific credential, and transmits the agent-specific credential to the requesting agent computing device 102 (or to a computing device identified in the request).

In FIG. 1, a system 100 includes the plurality of agent computing devices 102 communicating with the service 104 (e.g., a computing device implementing or executing the service 104) over a network 106 such as the Internet. In other embodiments, the network 106 is absent in other embodiments. The service 106 may be implemented with a general purpose computing device in the form of a computer. Generally, the data processors of the computer are programmed by means of instructions stored at different times in the various computer-readable storage media of the computer. Embodiments of the invention may be described and implemented in the general context of computer-executable instructions, such as program modules, executed by one or more computers or other devices. The computing device implementing the service 106 has access to or is associated with a computer-readable media such as a memory area 108. Computer readable media, which include both volatile and nonvolatile media, removable and non-removable media, may be any available medium that may be accessed by the service. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computing device implementing the service 106. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

In an embodiment, the memory area 108 stores the account credential (e.g., the first credential 118) associated with the plurality of agent computing devices 102. The memory area 108 also stores one or more computer-executable components such as an interface component 110, a credential component 112, a chain component 114, and a de-authorization component 116. The operation of these components is described in FIG. 5.

The service 106 includes a processor (not shown) configured to execute computer-executable instructions. Upon execution, the computer-executable instructions implement aspects of the invention. Exemplary computer-executable instructions for execution by the processor are described and illustrated in FIG. 2.

Figure 2:
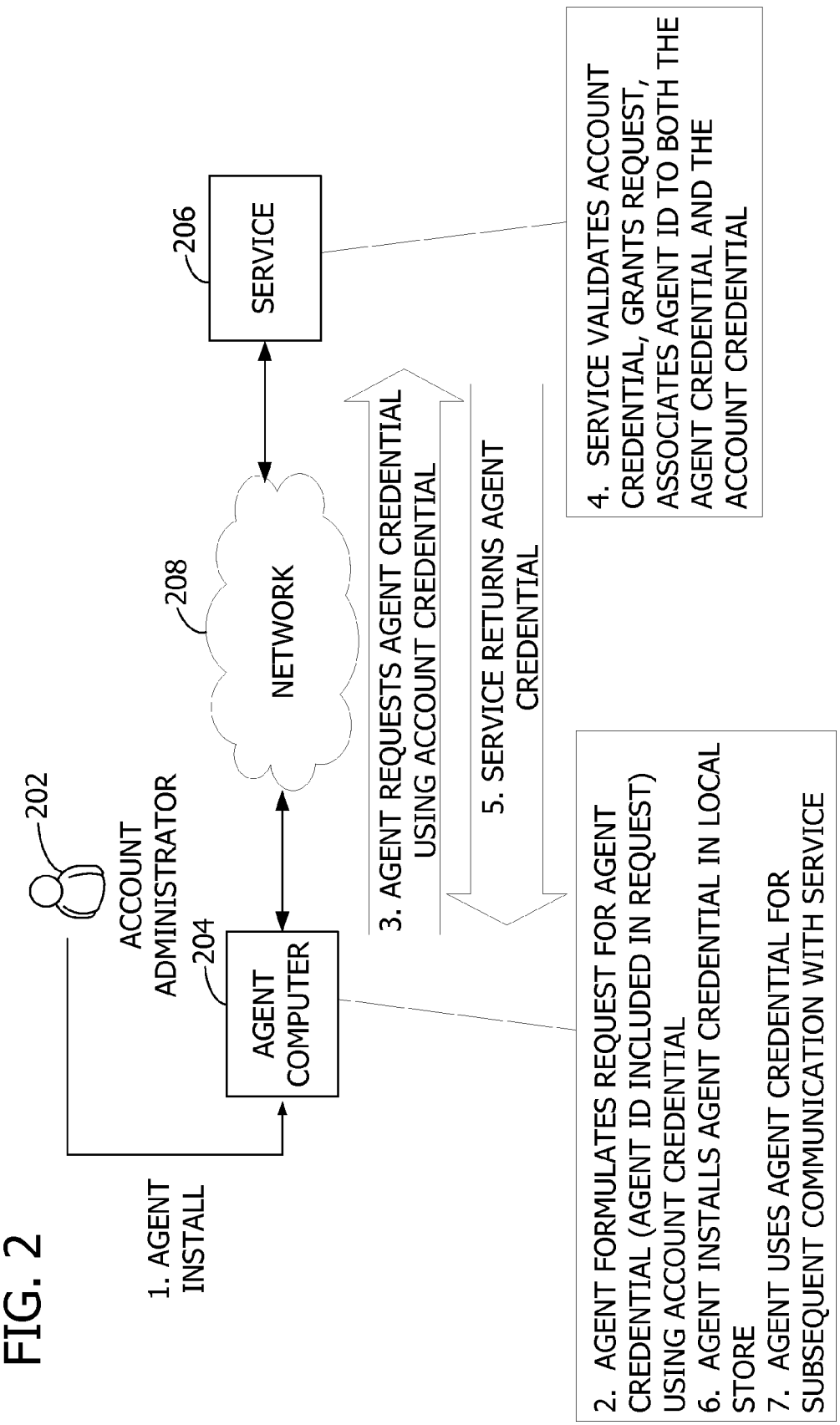
FIG. 2 is an exemplary block diagram illustrating deployment and set up of an agent computer.

Referring next to FIG. 2, an exemplary block diagram illustrates deployment and set up of an agent computer 204 or other agent computing device. As an example, an account administrator 202 installs the agent package, software product, or other software code that includes the account credential. The agent computer 204 formulates a request for the agent-specific credential using the account credential, an expired credential, a credential associated with another agent computing device, or another credential. In an embodiment, an agent identifier for the agent computer 204 is calculated based on hardware in the agent computer 204. The calculated agent identifier is included in the request.

Computer-executable instructions direct the service 206 (e.g., a first computing device) to receive the account credential from the agent computer 204 (e.g., a second computing device) over, for example, a network 208. In an embodiment, the agent computer 204 sends the account credential to the service 206 upon registration or installation of a software product by a user on the agent computer 204. Upon receipt of the account credential, the service 206 verifies that the received account credential is valid (e.g., not expired, the account associated with the account credential is active and in good standing, etc.). If the received account credential is invalid, the service 206 denies the request. If the received account credential is valid, the service 206 associates the agent computer 204 with the account associated with the account credential. Associating the agent computer 204 with the account indicates that the agent computer 204 and any other computing devices on the account are in the same group. In an embodiment, a list of assets (e.g., hardware) is associated with the account. Associating the agent computer 204 with the account includes adding an identifier associated with the agent computer 204 to the list of assets. In an embodiment, the list of assets for the account includes an identifier only for each of the plurality of computing devices associated with the account.

In an embodiment, the service 206 also determines if the agent identifier is authorized to be associated with the account identified by the account credential. In such an embodiment, the service 206 has access to a list of authorized agent computing devices for each account. If the agent computer 204 is not on the list of authorized agent computing devices for the account associated with the received account credential, the service 206 either denies the request or issues an agent-specific credential that is associated with the appropriate, authorized account.

Associating the agent computer 204 with the account exposes services particular to the account to the agent computer 204. The services are exposed from the service 206 as a function of the association between the agent computer 204 and the other computing devices on the account. The association is based on the agent-specific credential received in subsequent communications from the agent computer 204.

Alternatively or in addition, the exposed services are particular to the agent computer 204 (e.g., data formats, report types, report frequency, access to particular servers, etc.). In an embodiment, the service 206 tracks a plurality of agent-specific credentials associated with the account credential.

The service 206 generates the agent-specific credential (e.g., a second credential) based on the received account credential and, in an embodiment, a user identifier associated with the user. In an embodiment, the service 206 includes an expiration date on the generated agent-specific credential. There may also be an expiration date on the account credential.

The computer-executable instructions and components described herein constitute exemplary means for automatically provisioning the agent-specific credential as a function of the account credential upon receipt of the account credential from the agent computer 204. In an embodiment, the generated agent-specific credential is particular to the agent computer 204. In another embodiment, the generated agent-specific credential is particular to both the agent computer 204 and to the user. The computer-executable instructions further direct the service 206 to generate, particular to the user, an installation package to include the generated agent-specific credential. The agent-specific credential and the installation package are transmitted to the agent computer 204 (e.g., the second computing device). In an embodiment, the agent-specific credential and the installation package are encrypted prior to transmission to the agent computer 204. Dynamically generating the installation package for each agent computer 204 (e.g., customer) at signup time allows creation of a strong link between the agent computer 204 (or the customer's signup identity) and the generated, agent-specific credential.

In an embodiment, the operations executed by the service 206 and the agent computer 204 occur without human intervention.

The agent computer 204 executes the installation package to install the agent-specific credential on the agent computer 204. In an embodiment, the agent computer 204 automatically executes the installation package to install the second credential on the agent computer 204 without human intervention. The agent computer 204 may remove the account credential from the agent computer 204 upon receipt of the agent-specific credential.

The agent computer 204 includes the agent-specific credential in subsequent communications with the service 206. The agent-specific credential is used by the service 206 for authentication of the agent computer 204, to deliver agent-specific services, or to tailor existing services to the particular agent computer 204.

Figure 3:
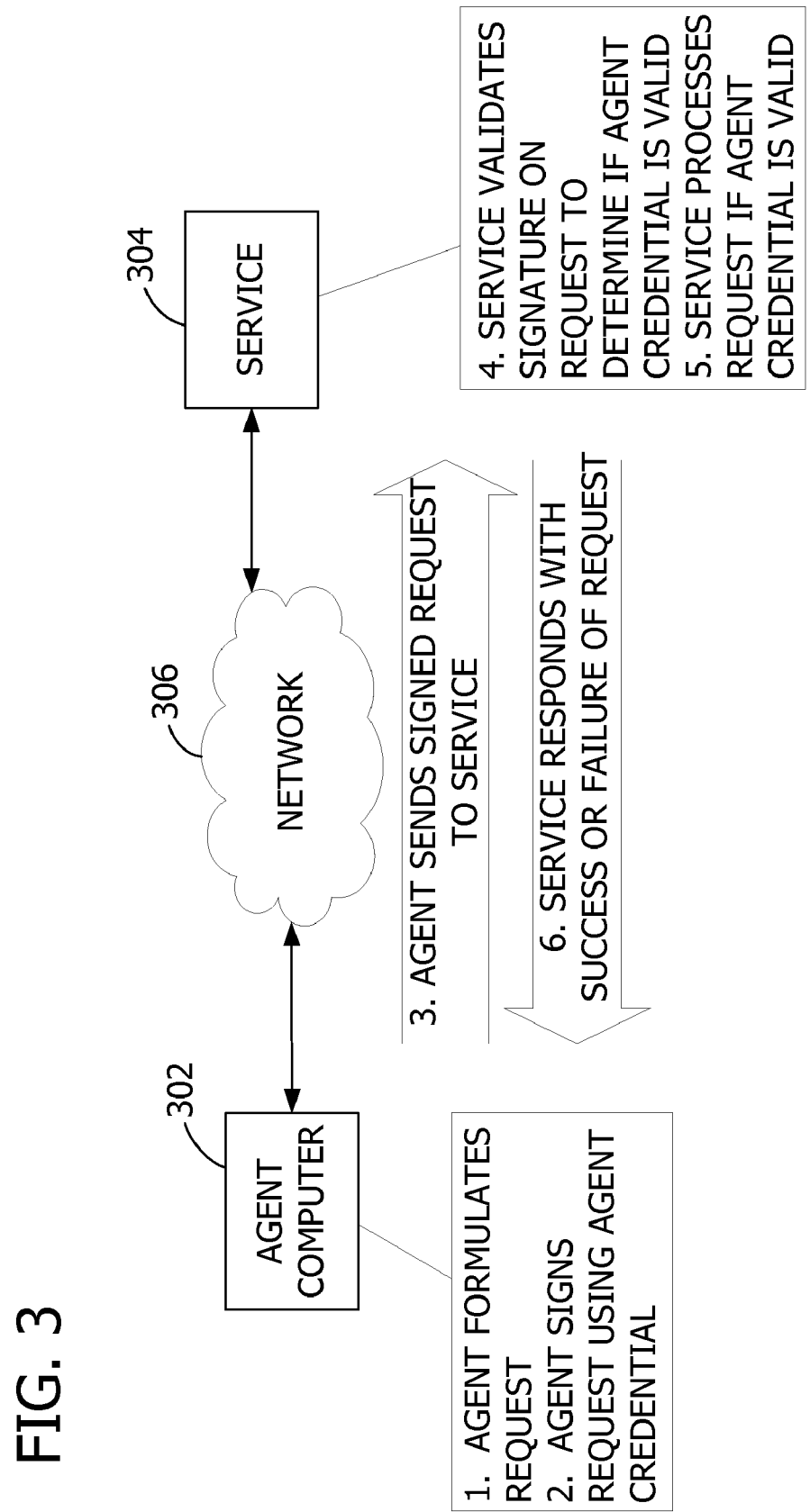
FIG. 3 is an exemplary block diagram illustrating authentication of the agent computer by the service via an agent-specific credential.

Referring next to FIG. 3, an exemplary block diagram illustrates authentication of the agent computer 302 by the service 304 via an agent-specific credential. The agent computer 302 includes the agent-specific credential in communications with the service 304 (e.g., to get data or to submit data), for example, over a network 306. In an embodiment, the agent computer 302 sends the agent-specific credential in a verification message that accompanies a request to the service 304. The service 304 validates the request (or authenticates the agent computer 302) using the agent-specific credential. Upon successful validation of the request, the service 304 processes the particular request. In general, the service 304 exposes operations or functionality to the agent computer 302 as a function of the association between the agent computer 302 and the account (e.g., and other computing devices also on the account) based on the agent-specific credential received in the request. The service 304 may detect that the agent-specific credential or the account associated therewith has expired or been revoked. Such an instance is described next in FIG. 4.

Figure 4:
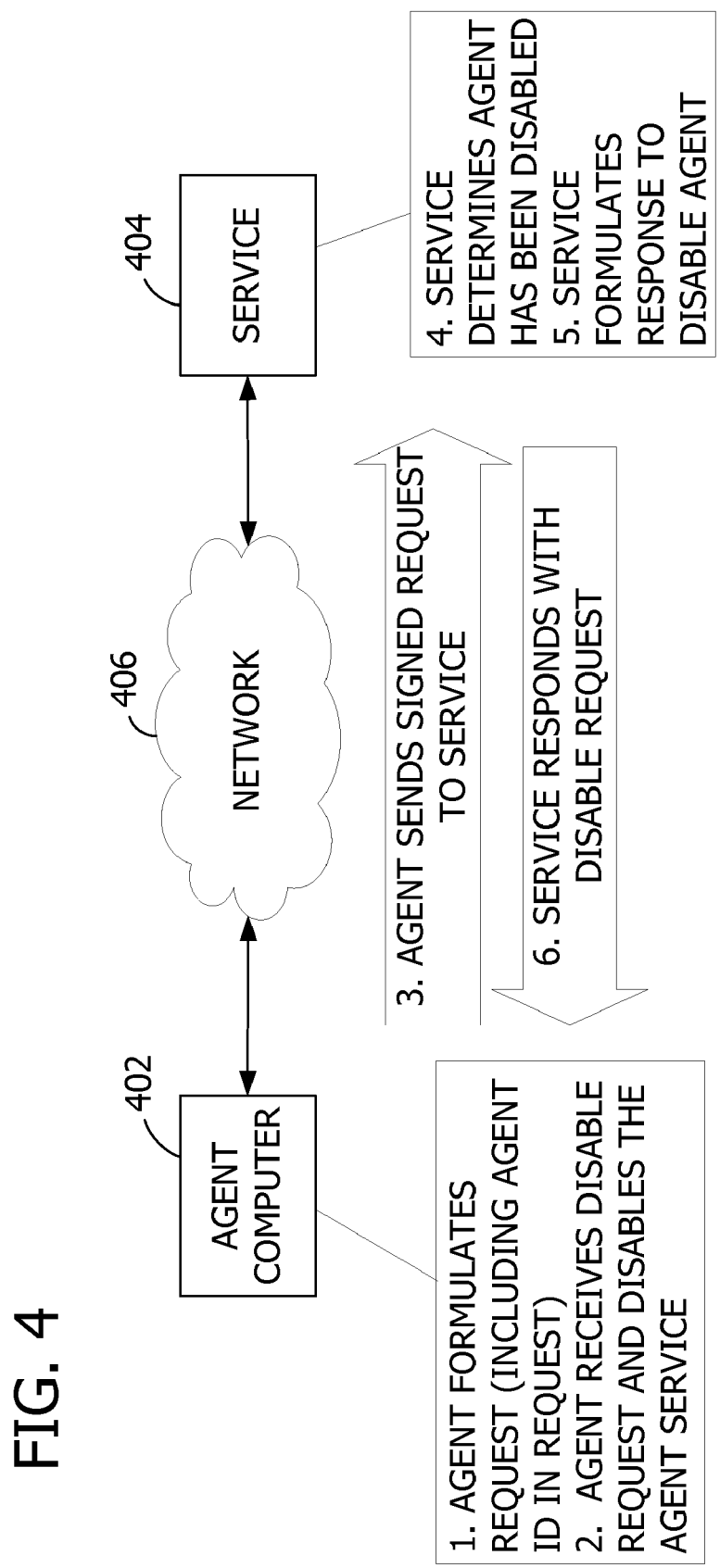
FIG. 4 is an exemplary block diagram illustrating the service disabling a credential particular to the agent computer.

Referring next to FIG. 4, an exemplary block diagram illustrates the service 404 disabling a credential particular to the agent computer 402 via communications over a network 406. In this example, the service 404 has determined that the agent-specific credential or the account associated therewith is invalid (e.g., expired or revoked). The service 404 halts further processing of the request and may send a fault, error message, disable request, or notification to the agent computer 402 informing the agent computer 402 of the status. Upon receipt of such a notification, the agent computer 402 may disable the software product or feature on the agent computer 402 that is associated with or communicating with the service 404. In an embodiment, the agent computer 402 renews the agent-specific credential before re-sending the request.

The operation of the service in FIG. 4 may be implemented by computer-executable instructions organized into one or more computer-executable components stored on one or more computer-readable media. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Exemplary components may include the interface component 110, the credential component 112, the chain component 114, and the de-authorization component 116. The interface component 110 receives the account credential (e.g., the first credential) from the agent computer 402. The received account credential is associated with a plurality of computing devices to which the computing device associated with the service 404 exposes services. The credential component 112 generates the agent-specific credential based on the received account credential. The generated agent-specific credential is particular to the agent computer 402. The chain component 114 associates the agent-specific credential with the account credential. The chain component 114 enables the tracking of a plurality of agent-specific credentials issued to various agent computers such as agent computer 402. The service 404 transmits the generated agent-specific credential to the agent computer 402. The agent computer 402 includes the agent-specific credential in subsequent communications with the service 404 for authentication by the service 404 of the agent computer 402.

The chain component 114 enables credential regeneration in the case that an agent credential has been used to image one or more other computing devices. For example, the agent credential may be used to seed these other computing devices. The agent credential is then considered by the service 404 to be the common or account credential, and the chain component 114 maintains a history of this chain of credentials (e.g., from the account credential to the agent-specific credential, and from the agent-specific credential to the next lower level of agent-specific credentials).

The de-authorization component 116 revokes the account credential which thereby revokes the agent-specific credential as a function of the association between the account credential and the agent-specific credential (by the chain component 114) to prevent access by the agent computer 402 to the services exposed by the computing device implementing the service 404. Alternatively or in addition, the de-authorization component 116, in conjunction with the chain component 114, allows logical revocation of chains of agent credentials by tracking which agent credentials were used to generate other agent credentials. In this manner, if an agent credential is used to seed unauthorized machines, all such machines may be blocked by de-authorizing the original agent credential.

Figure 5:
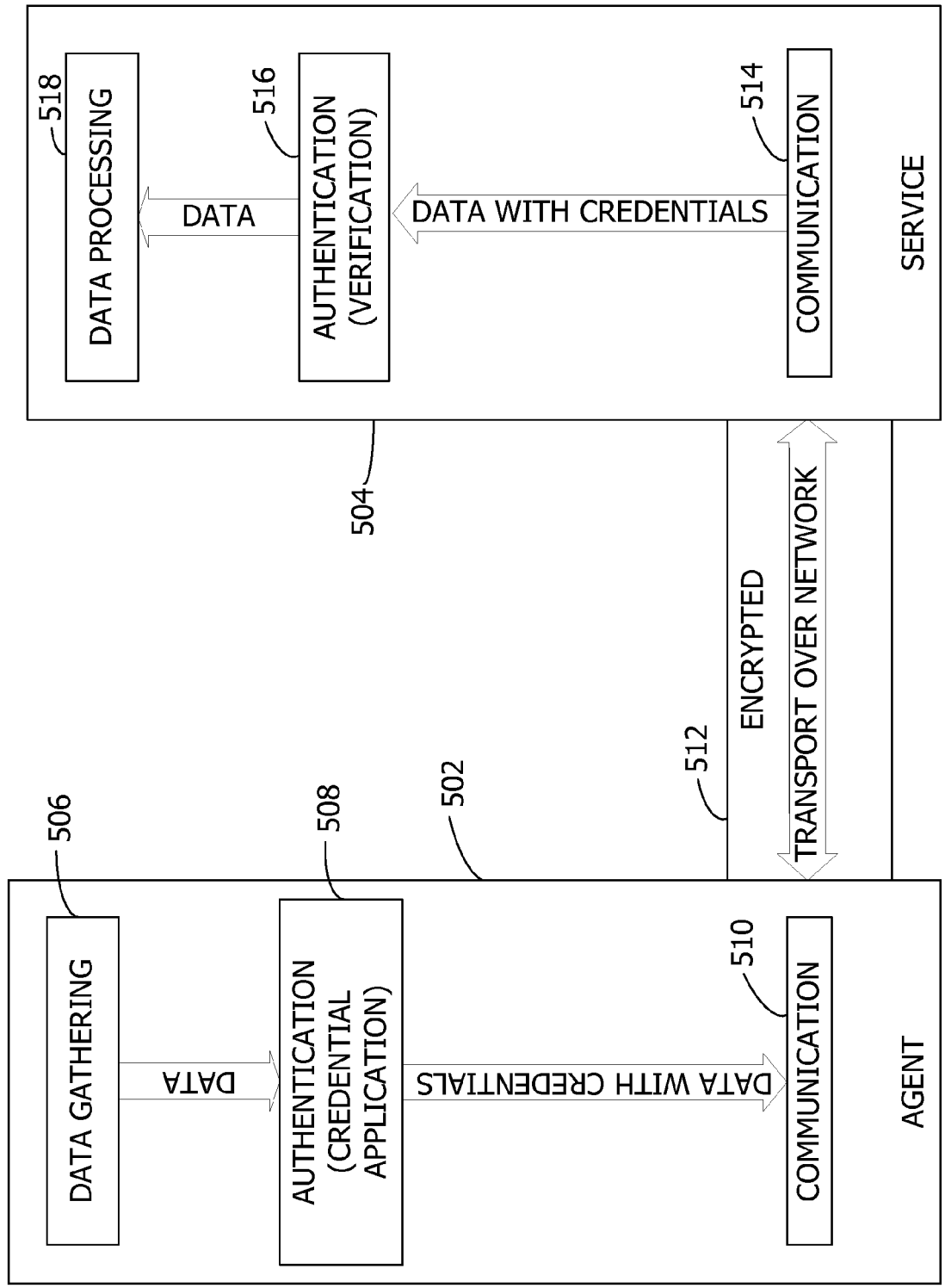
FIG. 5 is a block diagram illustrating the data flow between the agent computer and a service.

Referring next to FIG. 5, a block diagram illustrates the data flow between the agent 502 and a service 504. The agent 502 gathers data at 506, adds the agent credential at 508, and communicates the data with the agent credential at 510 in an encrypted fashion over a network at 512 to the service 504. The service 504 authenticates, validates, or verifies the data with the agent credential at 516 and processes the data in the request upon successful validation at 518.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer executes computer-executable instructions such as those illustrated in the figures and described herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
   receiving, by a first computing device, a first credential from a second computing device associated with a user and an identifier associated with the second computing device, said received first credential being associated with a plurality of computing devices associated with other users to which the first computing device exposes services and the identifier being calculated based on hardware in the second computing device, wherein the first credential is not unique to the second computing device associated with the user;
   associating the second computing device with the plurality of computing devices having the same received first credential, such that associating the second computing device with the plurality of computing devices associates the second computing device and the plurality of computing devices as both devices belonging to a particular account for accessing the exposed services on the first computing device based on a list of preauthorized computing devices and their associated calculated identifiers specified for the particular account;
   generating a second credential based on the received first credential and the received calculated identifier, said generated second credential being particular to the second computing device; and
   transmitting the generated second credential to the second computing device, wherein the second computing device includes the second credential in subsequent communications with the first computing device for authentication by the first computing device of the second computing device, wherein the first computing device exposes the services particular to the second computing device as a function of the particular account and the association between the second computing device and the plurality of computing devices based on the second credential received in the subsequent communications.

2. The method of claim 1, wherein a list of hardware assets only includes the identifier for each the plurality of computing devices, and wherein associating the second computing device with the plurality of computing devices comprises adding the identifier associated with the second computing device to the list of hardware assets.

3. The method of claim 1, further comprising encrypting the generated second credential prior to transmitting the generated second credential to the second computing device.

4. The method of claim 1, wherein receiving the first credential comprises receiving a request to register a software product from the second computing device, wherein the request comprises the first credential.

5. The method of claim 1, wherein receiving the first credential, associating the second computing device, generating the second credential, and transmitting the generated second credential occur without human intervention.

6. The method of claim 1, further comprising:
   issuing the first credential;
   including the issued first credential in a software product; and
   distributing the software product with the issued first credential to the plurality of computing devices.

7. The method of claim 1, further comprising disabling the first credential whereby the second credential is disabled as a function of the association between the second computing device and the plurality of computing devices.

8. The method of claim 1, wherein the services comprise one or more of the following: data formats, report types, report frequency, and access to particular servers.

9. The method of claim 1, wherein one or more computer-readable storage devices media have stored thereon computer-executable instructions for performing the steps of receiving, associating, determining, generating and transmitting.

10. A system comprising:
    a memory area for storing a first credential; and
    a processor configured to execute computer-executable instructions for:
    receiving, by the first computing device, the first credential from a second computing device associated with a user and an identifier associated with the second computing device upon registration of a software product by the user on the second computing device, said received first credential being associated with a plurality of computing devices associated with other users to which the first computing device exposes services and the identifier being calculated based on hardware in the second computing device, wherein the first credential is not unique to the second computing device associated with the user, and wherein the first credential represents an account credential associated with a particular account for accessing the exposed services on the first computing device for use with the plurality of computing devices, said particular account indicating that the second computing device and the plurality of computing devices on the account are in a group of authorized computing devices;
    associating the second computing device with the plurality of computing devices, wherein associating the second computing device with the plurality of computing devices indicates that the second computing device and the plurality of computing devices belong to the account based on a list of preauthorized computing devices and their associated calculated identifiers specified for the particular account;

generating a second credential based on the received first credential, the received calculated identifier, and a user identifier associated with the user, said generated second credential being particular to the second computing device and particular to the user associated with the second computing device;

generating, particular to the user, an installation package for the generated second credential; and transmitting the generated second credential and generated installation package to the second computing device, wherein the second computing device executes the installation package to install the second credential on the second computing device, wherein the second computing device includes the second credential in subsequent communications with the first computing device for authentication by the first computing device of the second computing device, wherein the first computing device exposes the services particular to the second computing device as a function of the particular account and the association between the second computing device and the plurality of computing devices based on the second credential received in the subsequent communications.

11. The system of claim 10, wherein the second computing device automatically executes the installation package to install the second credential on the second computing device without human intervention.

12. The system of claim 10, wherein the processor is further configured to execute computer-executable instructions for exposing, to the second computing device, the services particular to the second computing device as a function of the association between the second computing device and the plurality of computing devices.

13. The system of claim 12, wherein the services particular to the second computing device comprise one or more of the following: data formats, report types, report frequency, and access to particular servers.

14. The system of claim 10, further comprising means for automatically provisioning the second credential as a function of the first credential upon receipt of the first credential from the second computing device.

15. The system of claim 10, wherein the second credential represents an agent credential for use only with the second computing device.

16. The system of claim 10, wherein the processor is configured to execute the computer-executable instructions without human intervention.

17. One or more computer-readable tangible storage media not including a carrier wave or carrier signal having computer-executable components stored thereon, said components comprising:

an interface component for receiving, by a first computing device, a first credential from a second computing device associated with a user and an identifier associated with the second computing device, said received first credential being associated with a plurality of computing devices associated with other users to which the first computing device exposes services and the identifier being calculated based on hardware in the second computing device, wherein the first credential is not unique to the second computing device associated with the user;

a credential component for:

associating the second computing device with the plurality of computing devices having the same received first credential, wherein associating the second computing device with the plurality of computing devices indicates that the second computing device and the plurality of computing devices belong to a particular account for accessing the exposed services on the first computing device based on a list of preauthorized computing devices and their associated calculated identifiers specified for the particular account; and generating a second credential based on the received first credential and the received calculated identifier, said generated second credential being particular to the second computing device;

a chain component for associating the second credential with the first credential, wherein the first computing device transmits the generated second credential to the second computing device, wherein the second computing device includes the second credential in subsequent communications with the first computing device for authentication by the first computing device of the second computing device; and a de-authorization component for revoking the first credential which thereby revokes the second credential as a function of the association between the first credential and the second credential to prevent access by the second computing device to the services exposed by the first computing device.

18. The computer-readable storage media not including a carrier wave or carrier signal of claim 17, wherein the chain component enables the first computing device to expose the services to the second computing device as a function of the association between the second computing device and the plurality of computing devices in the list of hardware assets based on the second credential received in the subsequent communications.

19. The computer-readable storage media not including a carrier wave or carrier signal of claim 17, wherein the interface component, the credential component, the chain component, and the de-authorization component execute without human intervention.

* * * * *